United States Patent
Taunton

(10) Patent No.: US 6,405,474 B1
(45) Date of Patent: Jun. 18, 2002

(54) FLOATATION AND FISH HOOK SETTING DEVICE

(76) Inventor: Robert E. Taunton, 736 Shoreline Dr., Jacksons Gap, AL (US) 36861

( * ) Notice: Subject to any disclaimer, the term of this patent is extended or adjusted under 35 U.S.C. 154(b) by 0 days.

(21) Appl. No.: 09/732,576

(22) Filed: Dec. 8, 2000

(51) Int. Cl.$^7$ .......................... A01K 91/06; A01K 93/00
(52) U.S. Cl. .............................................. 43/15; 43/44.9
(58) Field of Search ........................ 43/15, 16, 44.87, 43/44.9, 44.91

(56) References Cited

U.S. PATENT DOCUMENTS

| | | | | |
|---|---|---|---|---|
| 542,917 A | * | 7/1895 | Bardsley | 43/15 |
| 711,318 A | * | 10/1902 | Hymers | 43/15 |
| 1,614,931 A | * | 1/1927 | Pennell | 43/15 |
| 2,204,560 A | * | 6/1940 | Allison | 43/15 |
| 2,481,453 A | * | 9/1949 | Stadelhofer | 43/15 |
| 2,560,875 A | * | 7/1951 | Knott | 43/15 |
| 2,631,399 A | * | 3/1953 | Sowa | 43/15 |
| 2,712,194 A | * | 7/1955 | Di Stefano | 43/15 |
| 2,784,515 A | * | 3/1957 | McBride et al. | 43/15 |
| 2,801,487 A | * | 8/1957 | Morgan | 43/15 |
| 2,858,634 A | * | 11/1958 | Bremer, Jr. | 43/15 |
| 2,876,578 A | * | 3/1959 | Argenio | 43/15 |
| 3,060,615 A | * | 10/1962 | Spets | 43/15 |
| 3,660,922 A | * | 5/1972 | Chill | 43/15 |
| 3,823,501 A | * | 7/1974 | Bybee | 43/15 |
| 3,974,588 A | * | 8/1976 | Blom et al. | 43/15 |
| 4,586,283 A | * | 5/1986 | Vocal | 43/15 |
| 5,309,663 A | * | 5/1994 | Shirley | 43/15 |
| 5,398,440 A | * | 3/1995 | Amundsen | 43/43.1 |
| 5,438,788 A | * | 8/1995 | Rich et al. | 43/15 |
| 5,515,638 A | * | 5/1996 | Shirley | 43/15 |
| D396,521 S | * | 7/1998 | Brackett, Sr. | D22/134 |
| 5,832,654 A | * | 11/1998 | McQueeny | 43/15 |
| 5,937,565 A | * | 8/1999 | Maric et al. | 43/15 |

FOREIGN PATENT DOCUMENTS

| | | | |
|---|---|---|---|
| EP | 919123 A1 | * | 6/1999 |
| FR | 2310091 B1 | * | 1/1977 |
| JP | 7-322797 B1 | * | 12/1995 |

* cited by examiner

Primary Examiner—Darren W. Ark

(57) ABSTRACT

A floatation and fish hook setting device for catching more fish and to prevent fish from getting away. The floatation and fish hook setting device includes an elongate tubular member having open ends and a bore extending therethrough; and also includes end-cap members being removably disposed upon the ends of the elongate tubular member; and further includes a floatation sleeve being disposed about the elongate tubular member; and also includes a fishing line assembly including an elastic member being disposed in the bore of the elongate tubular member, and also including fishing line members and a fish hook member being securely attached to one the fishing line members.

14 Claims, 2 Drawing Sheets

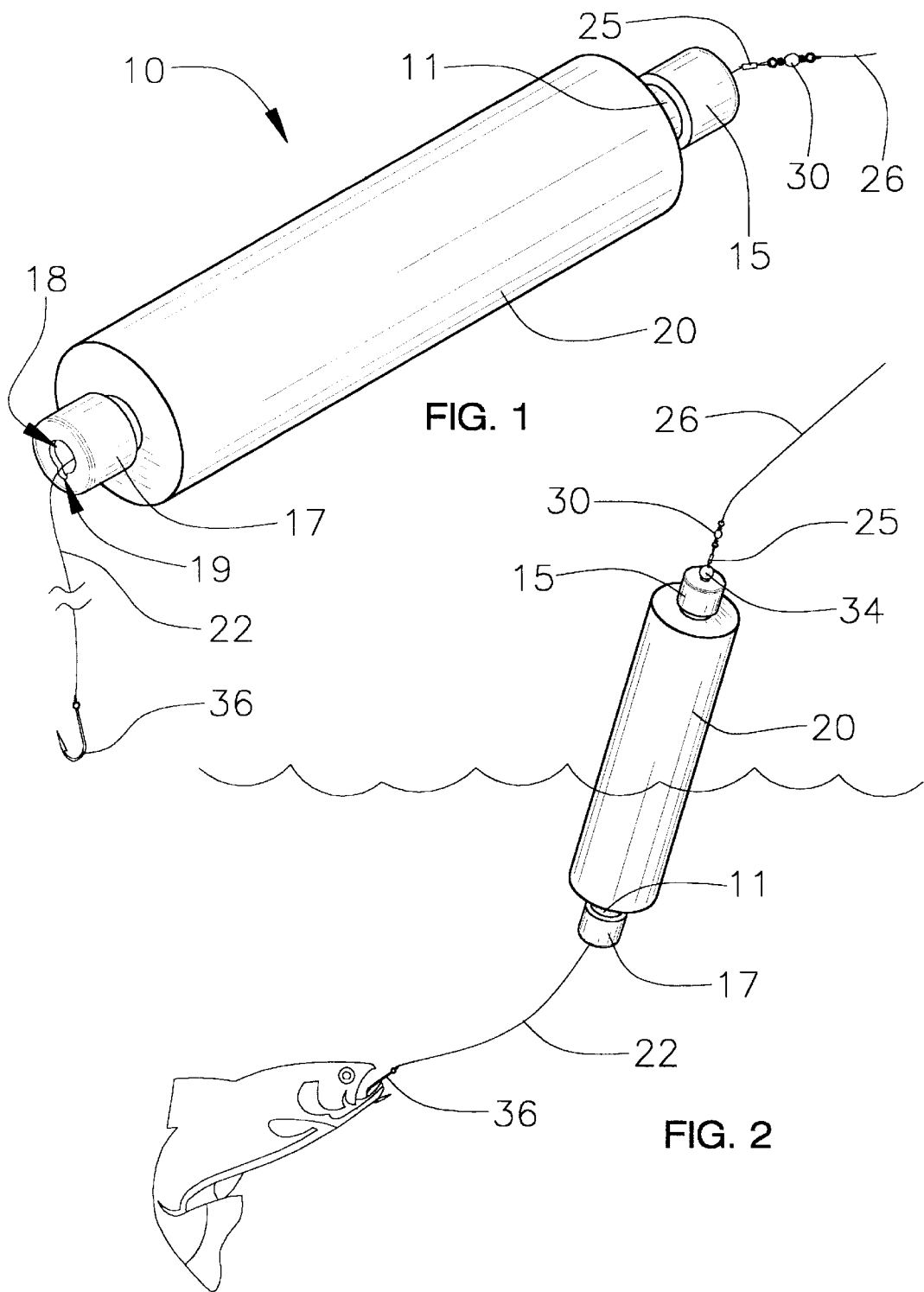

FLOATATION AND FISH HOOK SETTING DEVICE

BACKGROUND OF THE INVENTION

1. Field of the Invention

The present invention relates to a self-setting fish hook device and more particularly pertains to a new floatation and fish hook setting device for catching more fish and to prevent fish from getting away.

2. Description of the Prior Art

The use of a self-setting fish hook device is known in the prior art. More specifically, a self-setting fish hook device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,586,283; U.S. Pat. No. 2,858,634; U.S. Pat. No. 5,832,654; U.S. Pat. No. 5,438,788; U.S. Pat. No. 3,974,588; and U.S. Pat. No. Des. 396,521.

While these devices fulfill their respective, particular objectives and requirements, the aforementioned patents do not disclose a new floatation and fish hook setting device. The inventive device includes an elongate tubular member having open ends and a bore extending therethrough; and also includes end-cap members being removably disposed upon the ends of the elongate tubular member; and further includes a floatation sleeve being disposed about the elongate tubular member; and also includes a fishing line assembly including an elastic member being disposed in the bore of the elongate tubular member, and also including fishing line members and a fish hook member being securely attached to one the fishing line members.

In these respects, the floatation and fish hook setting device according to the present invention substantially departs from the conventional concepts and designs of the prior art, and in so doing provides an apparatus primarily developed for the purpose of catching more fish and to prevent fish from getting away.

SUMMARY OF THE INVENTION

In view of the foregoing disadvantages inherent in the known types of self-setting fish hook device now present in the prior art, the present invention provides a new floatation and fish hook setting device construction wherein the same can be utilized for catching more fish and to prevent fish from getting away.

The general purpose of the present invention, which will be described subsequently in greater detail, is to provide a new floatation and fish hook setting device which has many of the advantages of the self-setting fish hook device mentioned heretofore and many novel features that result in a new floatation and fish hook setting device which is not anticipated, rendered obvious, suggested, or even implied by any of the prior art self-setting fish hook device, either alone or in any combination thereof.

To attain this, the present invention generally comprises an elongate tubular member having open ends and a bore extending therethrough; and also includes end-cap members being removably disposed upon the ends of the elongate tubular member; and further includes a floatation sleeve being disposed about the elongate tubular member; and also includes a fishing line assembly including an elastic member being disposed in the bore of the elongate tubular member, and also including fishing line members and a fish hook member being securely attached to one the fishing line members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new floatation and fish hook setting device which has many of the advantages of the self-setting fish hook device mentioned heretofore and many novel features that result in a new floatation and fish hook setting device which is not anticipated, rendered obvious, suggested, or even implied by any of the prior art self-setting fish hook device, either alone or in any combination thereof.

It is another object of the present invention to provide a new floatation and fish hook setting device which may be easily and efficiently manufactured and marketed.

It is a further object of the present invention to provide a new floatation and fish hook setting device which is of a durable and reliable construction.

An even further object of the present invention is to provide a new floatation and fish hook setting device which is susceptible of a low cost of manufacture with regard to both materials and labor, and which accordingly is then susceptible of low prices of sale to the consuming public, thereby making such floatation and fish hook setting device economically available to the buying public.

Still yet another object of the present invention is to provide a new floatation and fish hook setting device which provides in the apparatuses and methods of the prior art some of the advantages thereof, while simultaneously overcoming some of the disadvantages normally associated therewith.

Still another object of the present invention is to provide a new floatation and fish hook setting device for catching more fish and to prevent fish from getting away.

Yet another object of the present invention is to provide a new floatation and fish hook setting device which includes an elongate tubular member having open ends and a bore extending therethrough; and also includes end-cap members being removably disposed upon the ends of the elongate tubular member; and further includes a floatation sleeve being disposed about the elongate tubular member; and also includes a fishing line assembly including an elastic member being disposed in the bore of the elongate tubular member, and also including fishing line members and a fish hook member being securely attached to one the fishing line members.

Still yet another object of the present invention is to provide a new floatation and fish hook setting device that is easy and convenient to use while fishing.

Even still another object of the present invention is to provide a new floatation and fish hook setting device that flips upright in the water to notify the user that a fish has been hooked.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new floatation and fish hook setting device according to the present invention.

FIG. 2 is a perspective view of the present invention shown in use.

DESCRIPTION OF THE PREFERRED EMBODIMENT

Figure 3:
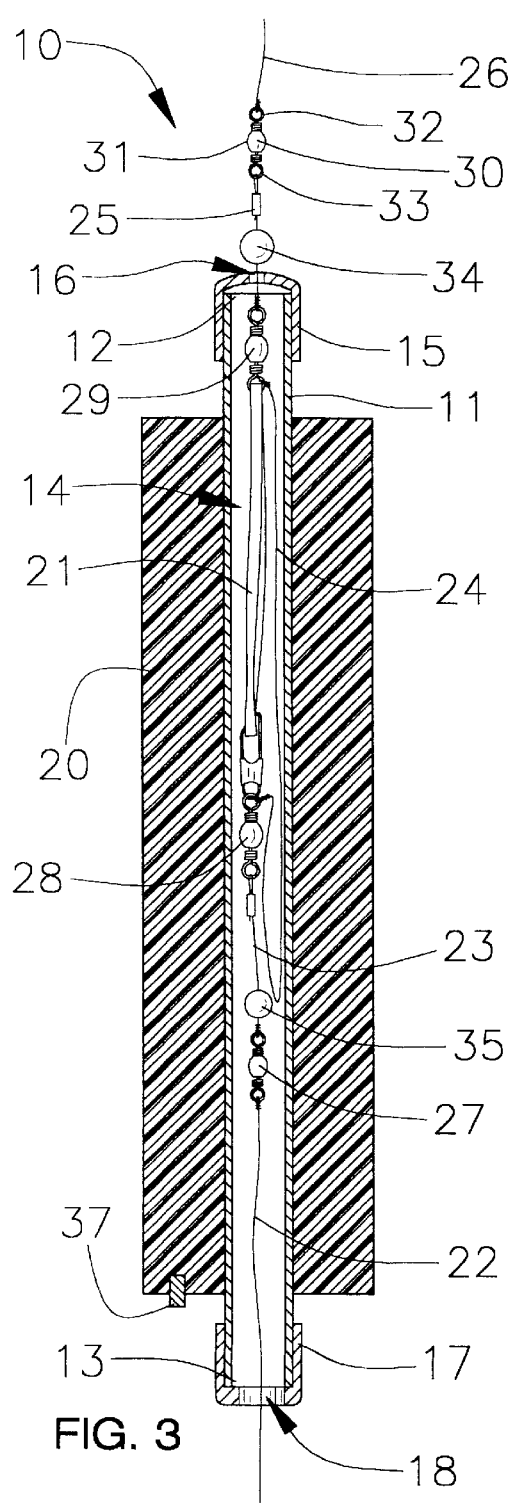
FIG. 3 is a cross-sectional view of the present invention with no fish being hooked.
Figure 4:
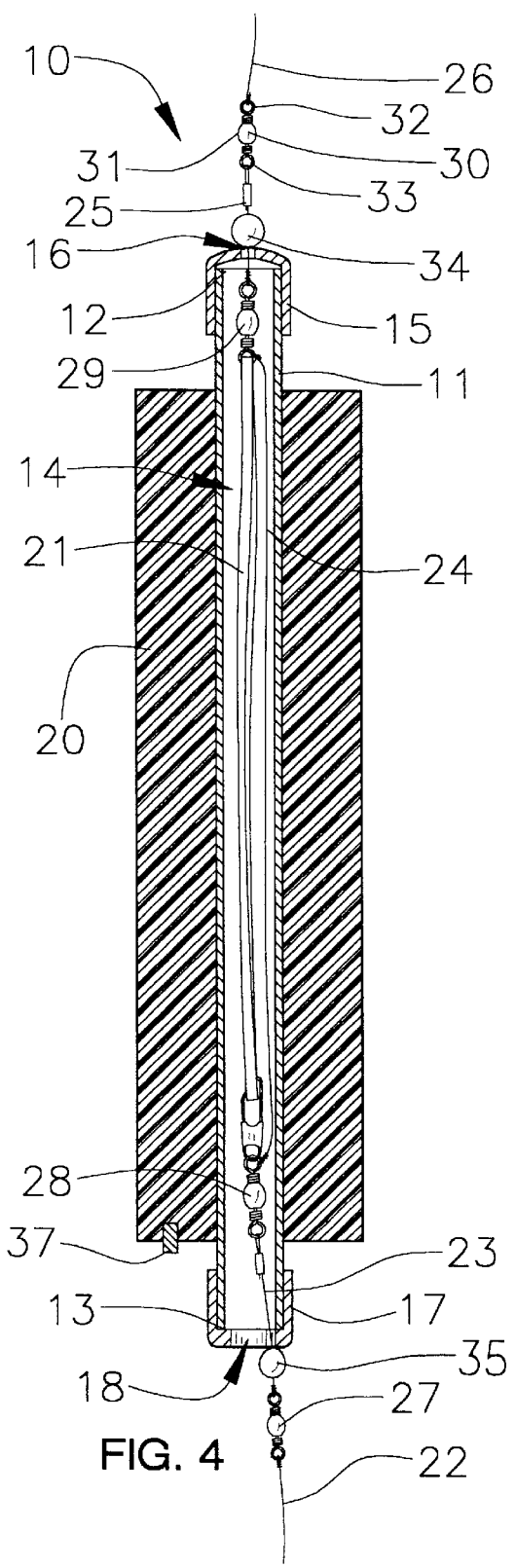
FIG. 4 is a cross-sectional view of the present invention with a fish being hooked.

With reference now to the drawings, and in particular to FIGS. 1 through 4 thereof, a new floatation and fish hook setting device embodying the principles and concepts of the present invention and generally designated by the reference numeral 10 will be described.

As best illustrated in FIGS. 1 through 4, the floatation and fish hook setting device 10 generally comprises an elongate tubular member 11 having open ends 12,13 and a bore 14 extending therethrough with the elongate tubular member 11 having a length of approximately 12 to 14 inches. End-cap members 15,17 are removably disposed upon the ends 12,13 of the elongate tubular member 11. The end-cap members 15,17 include a top end-cap member 15 having a pin-size hole 16 disposed therethrough, and also includes a bottom end-cap member 17 having an opening 18 therethrough with the opening 18 being relatively larger than the pin-size hole 16. The bottom end-cap member 17 has a notch 19 disposed in an edge forming the opening 18.

A floatation sleeve 20 is conventionally disposed about the elongate tubular member 11. The floatation sleeve 20 is made of a foam material capable of floating on water with the floatation sleeve 20 having a diameter of approximately 3 inches.

A fishing line assembly includes an elastic member 21 being disposed in the bore 14 of the elongate tubular member 11, and also includes fishing line members 22–26 and a fish hook member 36 being securely and conventionally attached to one the fishing line members 22–26. The fishing line assembly further includes swivel connectors 27–30 being conventionally attached to the elastic member 21 and to the fishing line members 22–26. The fishing line members 22–26 include a first fishing line member 22 being conventionally attached to the fish hook member 36 and to a first 27 of the swivel connectors, and also include a second fishing line member 23 which is conventionally attached to the first 27 of the swivel connectors and to a second 28 of the swivel connectors with the second 28 of the swivel connectors being conventionally connected to the elastic member 21, and further include a third fishing line member 24 which is conventionally attached to the second 28 of the swivel connectors and to a third 29 of the swivel connectors with the third 29 of the swivel connector also being conventionally attached to the elastic member 21, and also include a fourth fishing line member 25 which is conventionally attached to the third 29 of the swivel connectors and to a fourth 30 of the swivel connectors, and further include a fifth fishing line member 26 which is conventionally attached to the fourth 30 of the swivel connectors. The fishing line assembly further includes an anchor member 34 being securely and conventionally attached to the fourth fishing line member 25 and having a size relatively larger than that of the pin-size hole 16 and being disposed outside of the elongate tubular member 11. The fishing line assembly also includes a bead-shaped catch member 35 which is securely and conventionally attached to the second fishing line member 23 and which is movably disposed in and out of the elongate tubular member 11 through the opening 18 of the bottom end-cap member 17 and being adapted to engage the bottom end-cap member 17 with the second fishing line member 23 being received in the notch 19. The fourth fishing line member 25 is disposed through the pin-size hole 16 of the top end-cap member 15. The first 27 of the swivel connectors is movably in and out of the elongate tubular member 11. The second 28 and third 29.of the swivel connectors is disposed in the bore 14 of the elongate tubular member 11. The fourth 30 of the swivel connectors is disposed outside of the elongate tubular member 11. The first and fifth fishing line members 22,26 have lengths relatively longer than lengths of the second, third and fourth fishing line members 23–25. A weighted member 37 is securely and conventionally attached to the floatation sleeve 20 near the bottom end-cap member 17 to keep the bead-shaped catch member 35 at the notch 19. Each of the swivel connectors 27–30 includes a body member 31 and eyelets 32,33 rotatably and conventionally attached to the body member 31.

In use, the user floats the floatation and fish hook setting device 10 in the water with the fish hook member 36 being disposed in the water. Upon a fish striking the fish hook member 36, the first and second fishing line members 22,23 are extended from the elongate tubular member 11 with the second fishing line member being received in the notch and the bead-shaped catch member 35 being engaged with the bottom end-cap member 17 to essentially set the fish hook member 36 in the mouth of the fish.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A floatation and fish hook setting device comprising:
   an elongate tubular member having open ends and a bore extending therethrough;
   end-cap members being removably disposed upon said ends of said elongate tubular member;
   a floatation sleeve being disposed about said elongate tubular member; and
   a fishing line assembly including an elastic member being disposed in said bore of said elongate tubular member, and also including fishing line members and a fish hook member attached to one of said fishing line members;
   wherein said end-cap members include a top end-cap member having a hole disposed therethrough and a bottom end-cap member having an opening therethrough, said opening being relatively larger than said hole, said bottom end-cap member having a notch disposed in an edge forming said opening;
   wherein said fishing line assembly further includes swivel connectors being attached to said elastic member and to said fishing line members, said fishing line members including a first fishing line member being attached to said fish hook member and to a first of said swivel connectors, a second fishing line member attached to said first of said swivel connectors and to a second of said swivel connectors with said second of said swivel connectors being connected to said elastic member, a third fishing line member attached to said second of said swivel connectors and to a third of said swivel connectors with said third of said swivel connector also being attached to said elastic member, a fourth fishing line member attached to said third of said swivel connectors and to a fourth of said swivel connectors, and a fifth fishing line member attached to said fourth of said swivel connectors.

2. A floatation and fish hook setting device as described in claim 1, wherein said floatation sleeve is made of a foam material capable of floating on water.

3. A floatation and fish hook setting device as described in claim 1, wherein said fishing line assembly further includes an anchor member attached to said fourth fishing line member and having a size relatively larger than that of said hole and being disposed outside of said elongate tubular member.

4. A floatation and fish hook setting device as described in claim 1, wherein said fishing line assembly also includes a bead-shaped catch member attached to said second fishing line member and movably disposed in and out of said elongate tubular member through said opening of said bottom end-cap member and being adapted to engage said bottom end-cap member with said second fishing line member being received in said notch.

5. A floatation and fish hook setting device as described in claim 1, wherein said fourth fishing line member is extended through said hole of said top end-cap member, said first of said swivel connectors being movably disposed in and out of said elongate tubular member, said second and third of said swivel connectors being disposed in said bore of said elongate tubular member, said fourth of said swivel connectors being disposed outside of said elongate tubular member.

6. A floatation and fish hook setting device as described in claim 1, wherein said first and fifth fishing line members have lengths relatively longer than lengths of said second, third and fourth fishing line members.

7. A floatation and fish hook setting device as described in claim 1, wherein each of said swivel connectors includes a body member and eyelets rotatably attached to said body member.

8. A floatation and fish hook setting device comprising:
   an elongate tubular member having open ends and a bore extending therethrough;
   end-cap members being removably disposed upon said ends of said elongate tubular member;
   a floatation sleeve being disposed about said elongate tubular member; and
   a fishing line assembly including an elastic member being disposed in said bore of said elongate tubular member, and also including fishing line members and a fish hook member being securely attached to one of said fishing line members;
   wherein said end-cap members include a top end-cap member having a pin-size hole disposed therethrough, and also include a bottom end-cap member having an opening therethrough, said opening being relatively larger than said pin-size hole, said bottom end-cap member having a notch disposed in an edge forming said opening;
   wherein said fishing line assembly further includes swivel connectors being attached to said elastic member and to said fishing line members, said fishing line members including a first fishing line member being attached to said fish hook member and to a first of said swivel connectors, and also including a second fishing line member which is attached to said first of said swivel connectors and to a second of said swivel connectors with said second of said swivel connectors being connected to said elastic member, and further including a third fishing line member which is attached to said second of said swivel connectors and to a third of said swivel connectors with said third of said swivel connector also being attached to said elastic member, and also including a fourth fishing line member which is attached to said third of said swivel connectors and to a fourth of said swivel connectors, and further including a fifth fishing line member which is attached to said fourth of said swivel connectors.

9. A floatation and fish hook setting device as described in claim 8, wherein said fishing line assembly further includes an anchor member being securely attached to said fourth fishing line member and having a size relatively larger than that of said pin-size hole and being disposed outside of said elongate tubular member.

10. A floatation and fish hook setting device as described in claim 8, wherein said fishing line assembly also includes a bead-shaped catch member which is securely attached to said second fishing line member and which is movably disposed in and out of said elongate tubular member through said opening of said bottom end-cap member and being adapted to engage said bottom end-cap member with said second fishing line member being received in said notch.

11. A floatation and fish hook setting device as described in claim 8, wherein said fourth fishing line member is extended through said pin-size hole of said top end-cap member, said first of said swivel connectors being movably disposed in and out of said elongate tubular member, said second and third of said swivel connectors being disposed in said bore of said elongate tubular member, said fourth of said swivel connectors being disposed outside of said elongate tubular member.

12. A floatation and fish hook setting device as described in claim 8, wherein said first and fifth fishing line members have lengths relatively longer than lengths of said second, third and fourth fishing line members.

13. A floatation and fish hook setting device as described in claim 8, wherein each of said swivel connectors includes a body member and eyelets rotatably attached to said body member.

14. A floatation and fish hook setting device comprising:
  an elongate tubular member having open ends and a bore extending therethrough, said elongate tubular member having a length of approximately 12 to 14 inches;
  end-cap members being removably disposed upon said ends of said elongate tubular member, said end-cap members including a top end-cap member having a pin-size hole disposed therethrough, and also including a bottom end-cap member having an opening therethrough, said opening being relatively larger than said pin-size hole, said bottom end-cap member having a notch disposed in an edge forming said opening;
  a floatation sleeve being disposed about said elongate tubular member, said floatation sleeve being made of a foam material capable of floating on water, said floatation sleeve having a diameter of approximately 3 inches;
  a fishing line assembly including an elastic member being disposed in said bore of said elongate tubular member, and also including fishing line members and a fish hook member being securely attached to one of said fishing line members, said fishing line assembly further including swivel connectors being attached to said elastic member and to said fishing line members, said fishing line members including a first fishing line member being attached to said fish hook member and to a first of said swivel connectors, and also including a second fishing line member which is attached to said first of said swivel connectors and to a second of said swivel connectors with said second of said swivel connectors being connected to said elastic member, and further including a third fishing line member which is attached to said second of said swivel connectors and to a third of said swivel connectors with said third of said swivel connector also being attached to said elastic member, and also including a fourth fishing line member which is attached to said third of said swivel connectors and to a fourth of said swivel connectors, and further including a fifth fishing line member which is attached to said fourth of said swivel connectors, said fishing line assembly further including an anchor member being securely attached to said fourth fishing line member and having a size relatively larger than that of said pin-size hole and being disposed outside of said elongate tubular member, said fishing line assembly also including a bead-shaped catch member which is securely attached to said second fishing line member and which is movably disposed in and out of said elongate tubular member through said opening of said bottom end-cap member and being adapted to engage said bottom end-cap member with said second fishing line member being received in said notch, said fourth fishing line member being disposed through said pin-size hole of said top end-cap member, said first of said swivel connectors being movably disposed in and out of said elongate tubular member, said second and third of said swivel connectors being disposed in said bore of said elongate tubular member, said fourth of said swivel connectors being disposed outside of said elongate tubular member, said first and fifth fishing line members having lengths relatively longer than lengths of said second, third and fourth fishing line members; and
  a weighted member being securely attached near said bottom end-cap member to keep said bead-shaped catch member at said notch.

* * * * *